United States Patent
Genochio et al.

(10) Patent No.: US 10,146,846 B2
(45) Date of Patent: Dec. 4, 2018

(54) USER INTERFACE FOR EFFICIENTLY CHANGING SEARCH CRITERIA

(75) Inventors: Mary Genochio, San Jose, CA (US); Paul Chamberlain, Fremont, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 848 days.

(21) Appl. No.: 13/436,708

(22) Filed: Mar. 30, 2012

(65) Prior Publication Data

US 2013/0086107 A1   Apr. 4, 2013

Related U.S. Application Data

(60) Provisional application No. 61/541,443, filed on Sep. 30, 2011.

(51) Int. Cl.
 *G06F 17/30* (2006.01)
 *G06Q 10/06* (2012.01)

(52) U.S. Cl.
 CPC .. *G06F 17/30572* (2013.01); *G06F 17/30383* (2013.01); *G06F 17/30554* (2013.01); *G06Q 10/06* (2013.01)

(58) Field of Classification Search
 CPC ................ G06F 17/30696; G06F 17/30572
 USPC ....................................................... 707/770
 See application file for complete search history.

(56) References Cited

U.S. PATENT DOCUMENTS

| | | | |
|---|---|---|---|
| 5,608,899 A | 3/1997 | Li et al. | |
| 7,308,457 B1 | 12/2007 | Sundman et al. | |
| 7,523,090 B1 | 4/2009 | Sundman et al. | |
| 7,949,953 B2 | 5/2011 | Bhatt et al. | |
| 8,438,177 B2 | 5/2013 | Paulsen et al. | |
| 9,529,843 B2 | 12/2016 | Schwartz et al. | |
| 2004/0225955 A1* | 11/2004 | Ly | G06Q 10/06 715/273 |
| 2008/0109740 A1* | 5/2008 | Prinsen et al. ................ 715/764 | |
| 2008/0163099 A1* | 7/2008 | Gu et al. ........................ 715/780 | |
| 2008/0301086 A1* | 12/2008 | Gupta | G06F 17/30592 707/2 |
| 2010/0100562 A1* | 4/2010 | Millsap | G06T 11/206 707/770 |

(Continued)

OTHER PUBLICATIONS

Chodnicki, "Creating Dashboards with CDE", Jun. 28, 2011.*

*Primary Examiner* — Neveen Abel Jalil
*Assistant Examiner* — Dawaune Conyers
(74) *Attorney, Agent, or Firm* — Kilpatrick Townsend & Stockton LLP

(57) ABSTRACT

Methods and apparatus are disclosed for updating displayed representations of data. The methods and apparatus include displaying an input component to receive query criteria based on one or more data fields displayed in charts, receiving the query criteria in a single request from the input component, updating queries associated with chart displays to include the query criteria, executing the queries, and updating the charts based upon results of executing the queries. The query criteria may include a data value associated with the data field. The query criteria may include a condition based upon the data fields, and can be added to conditional expressions in the queries. Updating the charts may include displaying graphical chart elements that are proportional in size to values of the data fields of the results of executing the plurality of queries.

20 Claims, 11 Drawing Sheets

(56) References Cited

U.S. PATENT DOCUMENTS

| | | | |
|---|---|---|---|
| 2010/0299348 A1* | 11/2010 | Gill et al. | 707/769 |
| 2012/0041990 A1* | 2/2012 | Kreindlina | G06F 17/30572 707/805 |

* cited by examiner

FIG. 4D

USER INTERFACE FOR EFFICIENTLY CHANGING SEARCH CRITERIA

CROSS-REFERENCES TO RELATED APPLICATIONS

The present application claims the benefit and priority under 35 U.S.C. 119(e) of U.S. Provisional Application No. 61/541,443, filed Sep. 30, 2011, entitled "CASCADING SEARCH FOR A SUPPLY/DEMAND DASHBOARD," the entire contents of which are incorporated herein by reference for all purposes.

BACKGROUND

This application relates to data retrieval and presentation, and more specifically to user interfaces for efficiently changing search criteria used to retrieve and display data.

Data processing systems can store, modify, and display data for a wide range of applications. For example, a purchasing system may provide for submission and fulfillment of purchase orders, which are stored in a database when they are received, submitted to other systems for processing, displayed in response to user queries about purchase order status, and eventually deleted from the database once the purchase orders are complete. Other types of systems may process different data and perform different actions with the data. For example, a system that directs air traffic may store aircraft flight data in a database and display the data in various ways in response to user requests. A medical records system may store patient information in a database and display portions of the patient information. The queries that are used to retrieve data are ordinarily expressed using a language such as Structured Query Language ("SQL"). Such query languages are complex and inconvenient to use, so graphical user interfaces are provided to simplify the retrieval of data. Graphical user interfaces can provide features that enable users to select or define search criteria in a more straightforward manner. For example, a list of predefined search criteria may be presented, with descriptions tailored to the particular type of data used in the application, and users can select the desired search criteria in the user interface to cause data matching the search criteria to be displayed.

SUMMARY

Embodiments of the present invention provide for updating displayed representations of data. Methods and apparatus are provided that include displaying an input component to receive query criteria based on one or more data fields displayed in charts, receiving the query criteria in a single request from the input component, updating queries associated with chart displays to include the query criteria, executing the queries, and updating the charts based upon results of executing the queries. The query criteria may include a data value associated with the data field. The query criteria may include a condition based upon the data fields, and can be added to conditional expressions in the queries. Updating the charts may include displaying graphical chart elements that are proportional in size to values of the data fields of the results of executing the plurality of queries.

According to an embodiment, a method is provided that includes displaying, by a computer system, an input component in a user interface, the component configured to receive query criteria based on one or more data fields displayed in a plurality of charts, receiving, by the computer system, the query criteria in a single request from the input component, updating, by the computer system, a plurality of queries associated with a plurality of chart displays to include the query criteria, executing, by the computer system, the plurality of queries, and updating, by the computer system, the plurality of chart displays based upon results of executing the plurality of queries.

Embodiments may include one or more of the following features. The query criteria may comprise one or more data values associated with at least one of the one or more data fields. Updating the plurality of queries may comprise including the query criteria in conditional expressions in the plurality of queries. Updating the plurality of queries may further comprise adding a condition based upon the data field to the conditional expressions in the plurality of queries. Updating the plurality of chart displays may comprise displaying one or more graphical chart elements that are proportional in size to values of the one or more data fields of the results of executing the plurality of queries. The one or more data fields may correspond to one or more database columns in a database. The plurality of queries may be configured to select data from the database using a conditional expression that references the one or more database columns. Updating the plurality of chart displays may comprise displaying, on the computer system, one or more updated chart elements that are proportional in size to one or more updated data values from one or more database columns retrieved from the database in response to executing the updated first and second queries. The query criteria may include an additional data value, and updating the plurality of charts may comprise retrieving from the database, by the computer system, one or more updated data values that are associated with the additional data value by one or more rows in the database. Updating the plurality of chart displays may comprise displaying one or more chart elements that are proportional in size to the one or more updated data values.

According to another embodiment, non-transitory computer-readable medium having stored thereon program code executable by a computer system, the program code comprising program code that causes the computer system to display first and second charts representing first and second data sets selected from a database based upon respective first and second queries, program code that causes the computer system to display one or more data input components configured to receive additional query criteria based upon at least one data field that is included in the first and second data sets, program code that causes the computer system to receive the additional query criteria, program code that causes the computer system to update the first and second queries to include the additional query criteria, program code that causes the computer system to execute the updated first and second queries, and program code that causes the computer system to display updated first and second charts based upon results of executing the respective first and second queries.

Embodiments may include one or more of the following features. The program code that causes the computer system to update the first and second queries may comprise program code that causes the computer system to add a condition based upon the data field to the first and second queries. The program code that causes the computer system to display the first and second charts may comprise program code that causes the computer system to display one or more chart elements that are proportional in size to one or more data values in the first data set, wherein the one or more data values in the first data set may be retrieved from one or more database columns selected from the database by the first query. The additional query criteria may include an additional data value, and the program code that causes the computer system to display updated first and second charts may comprise program code that causes the computer system to retrieve from the database one or more updated data values that are associated with the additional data value by one or more rows in the database. The program code that causes the computer system to display updated first and second charts may comprise program code that causes the computer system to display one or more chart elements that are proportional in size to the one or more updated data values.

According to another embodiment of the present invention, a system is provided. The system includes a processor configured to display first and second charts representing first and second data sets selected from a database based upon respective first and second queries, display one or more data input components configured to receive additional query criteria based upon at least one data field that is included in the first and second data sets, receive the additional query criteria, update the first and second queries to include the additional query criteria, execute the updated first and second queries, and display updated first and second charts based upon results of executing the respective first and second queries.

BRIEF DESCRIPTION OF THE DRAWINGS

FIG. 4D illustrates a search criteria input box in a chart user interface in accordance with one embodiment.

DETAILED DESCRIPTION

Figure 1:
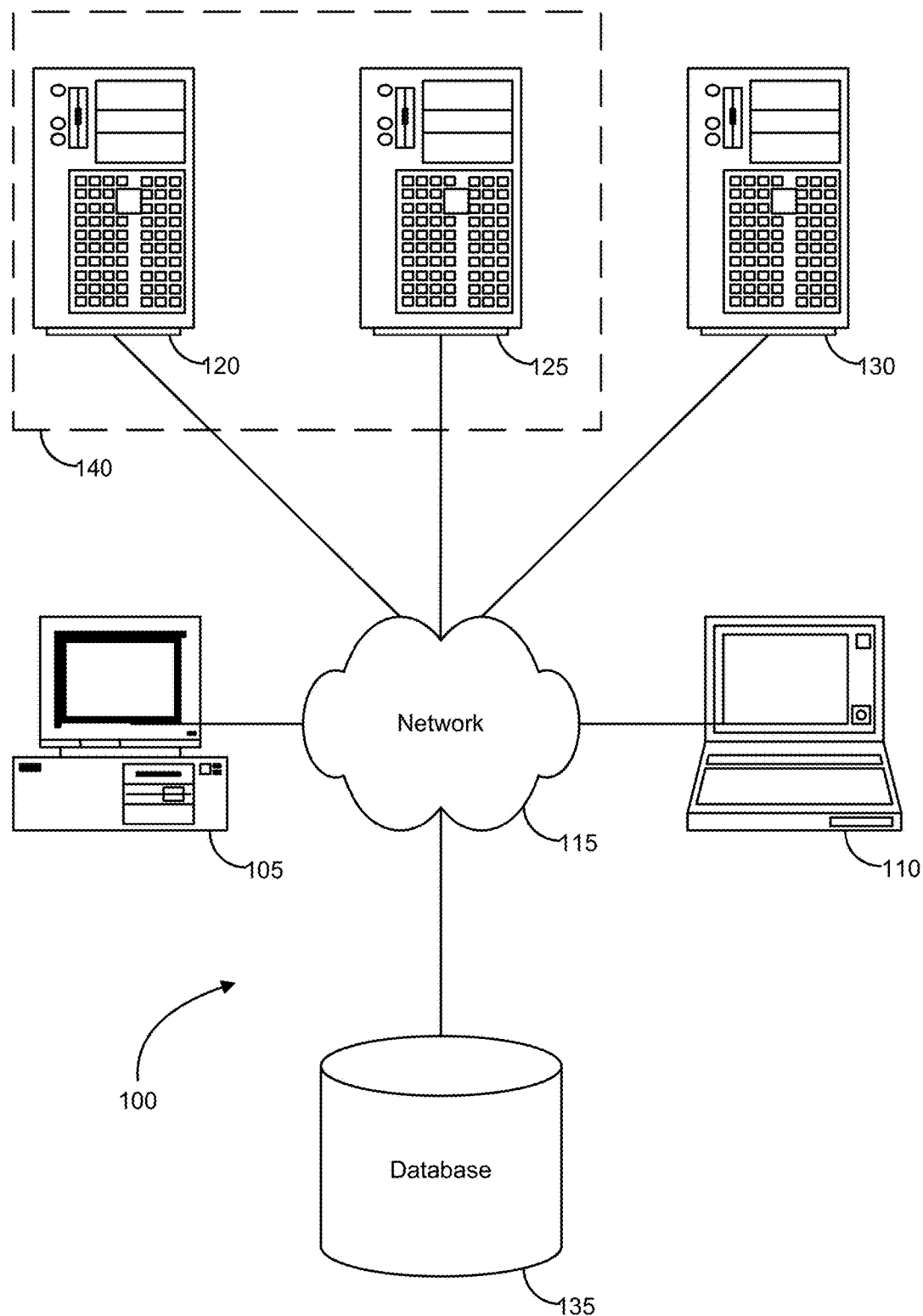
FIG. 1 is a block diagram illustrating components of an exemplary operating environment in which various embodiments may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

FIG. 1 is a block diagram illustrating components of an exemplary operating environment in which various embodiments of the present invention may be implemented. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server (s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
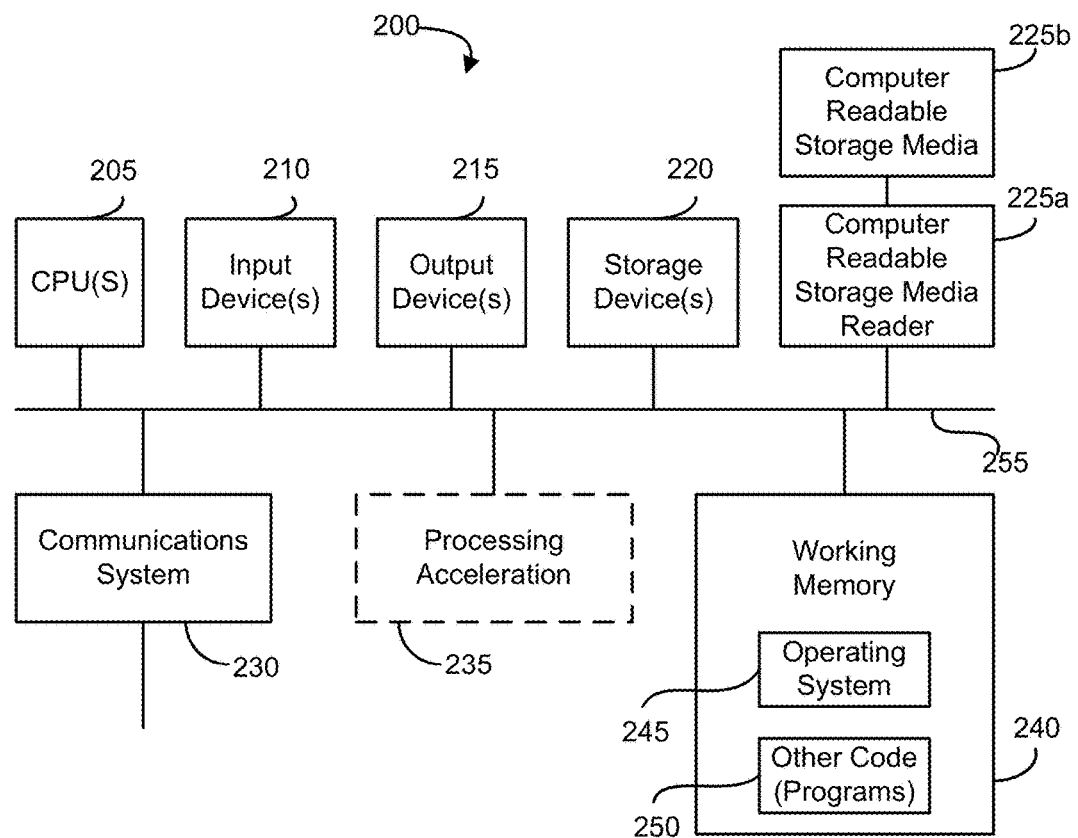
FIG. 2 is a block diagram illustrating an exemplary computer system in which embodiments may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225*a*, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225*a* can further be connected to a computer-readable storage medium 225*b*, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

The information stored in a database can be arranged in a table structure, in which each table has columns that represent the data values associated with a particular data item, such as the source of a purchase request and an item identifier that represents the item being purchased. A set of values for each column is represented as a row in the table. For example. purchase orders for two different items may be represented by two different rows. The attributes of each item, e.g., the item identifier, may be represented as column values associated with the row that represents that item. Database columns are also referred to as fields, and rows are also referred to as records. The data can be retrieved from the database using queries, which specify particular columns from which values are to be retrieved.

As an example, the item identifiers of all rows in a table named Orders can be retrieved using the query "select ItemID from Orders." To execute the query, the query is submitted to a database management system, e.g., the Oracle® relational database management system or the like. An application program can generate the query and send it to the database system for execution by invoking computer program code that causes execution of queries. The database then executes the query, e.g., translates the query into data retrieval operations which are then used to retrieve the data values of the database columns specified in the query. The values of the requested columns from one or more rows in the database are returned as results of the query. The number of rows of data returned by the query depends on the query and the specific data stored in the database. If the query does not include any conditions, then the selected columns of all rows in the database are returned as results of the query. If the query is associated with a condition, e.g., "select ItemID wherein Source="Sales order", then only database rows having column values for which the condition is true are returned.

For example, consider a table that has two rows, one with an Item column value of 10, and the other with an Item column value of 20. The query "Select ItemID from Orders" would return the values 10 and 20. The query "Select ItemID from Orders where ItemID <15" would return the value 10. As an example, if the Orders table has columns named ItemID and Quantity, with rows having values [ItemID=1, Quantity=10], [ItemID=2, Quantity=12], and [ItemID=3, Quantity=16], then the query "select ItemID, Quantity from Orders where ItemID <3" would return the rows [1, 10] and [2, 12]. The results of a query can be displayed in a user interface as a table of numeric values and/or in graphical formats, such as charts or graphs. The results of the aforementioned query may be shown as, for example, a pie chart with two sections: a first section, e.g., shaded in a red color, corresponds to the [1, 10] result and shows the quantity 10 as a slice of a pie chart. The entire pie chart represents the total quantity of orders in the results, e.g., 10+12=22 units. The portion of the pie corresponding to the first result represents 10 items and is shown in the pie chart as 10/22 of the chart shaded in one color. The portion of the pie chart corresponding to the second result represents 12/22 of the chart shaded in a second color. Changing the query can change the search results and consequently the chart, as may be seen if the condition is removed from the aforementioned query. Without the condition, the query is "select ItemID, Quantity from Orders" and the query results are [1, 10], [2, 12], and [3, 16]. A pie graph showing these results would have three slices, corresponding to 10/38, 12/38, and 16/38 of the pie. Each slice of this displayed graphical pie can be labeled to indicate the corresponding ItemID and quantity.

Figure 3A:
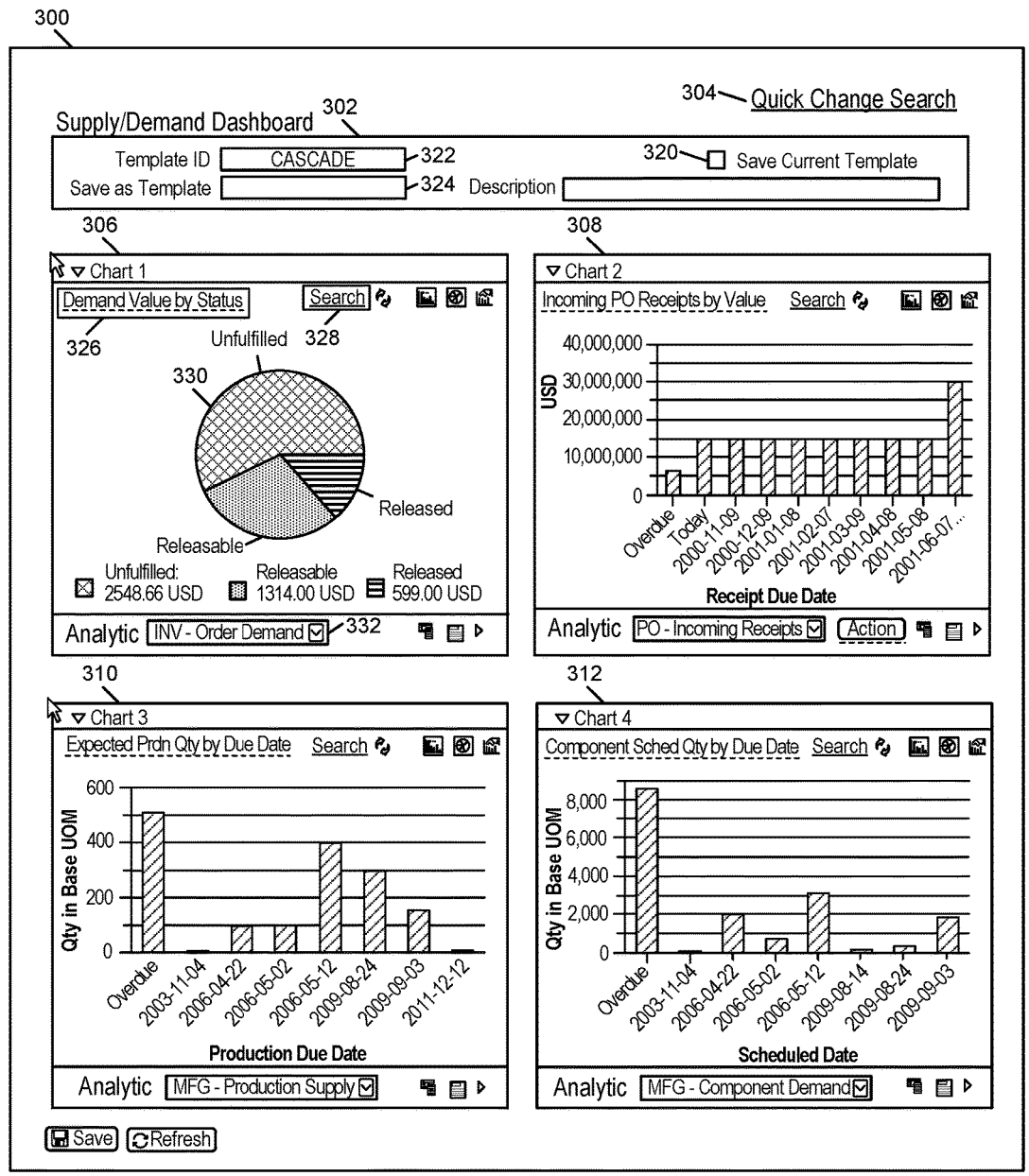
FIG. 3A illustrates a chart presentation user interface 300 in accordance with one embodiment.

FIG. 3A illustrates a chart presentation user interface 300 in accordance with one embodiment. The chart presentation user interface 300, also referred to as a Supply/Demand Dashboard, displays one or more charts 306-312 depicting supply and/or demand data. The user interface 300 can be displayed by a display device such as the output device 215 of the computer system 200 of FIG. 2. The Dashboard may be displayed by a web browser or other application program that can be executed on the client computer 105 of FIG. 1. In one embodiment, the Dashboard is implemented by computer program code and data, some or all of which can be received by the client computer 105 from the server computer 120 via the network 115. For example, the server 120 may host a web server program that sends the Dashboard program code and data to the client 105 in response to user requests to access the Dashboard.

According to one embodiment and as illustrated here, a Cascading Search feature is provided by a chart user interface 300, which is also referred to herein as a Supply/Demand Dashboard. The chart user interface can contain multiple sections, each containing a different type of chart. The charts display a representation of data retrieved from a database in accordance with search criteria associated with each chart. The search criteria can be, for example, particular data values that are to be used in a database query to retrieve data for the charts. For example, a first chart, which represents the status of sales orders, may have associated search criteria specifying that a database field named "Source" is to have the value "Sales Order." With this criteria, the data records selected for display in the chart will be those with the value "Sales Order" in their "Source" field.

In one aspect, the Cascading Search feature allows the user to change search criteria once for all charts on the Dashboard, so that there is no need to change the search criteria for each chart. This solution can save the user time, and allows the user to quickly see a consistent picture of the data, such as demand and supply data. In the prior solution, the user had to change the same criteria individually for each chart, and risked entering incorrect search criteria for one or more of the charts. Embodiments of the present invention provide for performing searches on data throughout any software product, and this solution increases productivity and allows the user to quickly get a clear picture of data, such as a supply and demand situation.

As illustrated, the chart user interface 300 can contain multiple sections 306-312, each containing a chart of the user's choosing from a pre-defined list of available charts. Four sections are shown in this example, but any number of sections can be presented. For example, a user may choose to configure the user interface 300 to display two charts instead of four. The charts display a representation of data retrieved from a database in accordance with search criteria. The search criteria can be, for example, particular data values that are to be used in a database query to retrieve data for the charts. For example, the first chart 306, which represents the status of sales orders, may have associated search criteria that specifies that a database field named "Source" is to have the value "Sales Order." With this criteria, the data records selected for display in the chart will be those with the value "Sales Order" in their "Source" field.

The available charts can be, for example, Order Demand, Component Demand, Production Supply, Incoming Receipts, and Planning Violations. Each chart type can be associated with a different set of search criteria, and the values or other search criteria entered by the user in the search input box 332 can be used to retrieve the data that is represented in the associated chart. To change the search criteria for all of the charts 306-312, a user can select (e.g., click on) a "Search" link of each chart (e.g., the Search link 328 of the chart 306), and change the search criteria separately for each chart 306-312 using a search dialog box 332. For instance, if the user interface 300 is currently displaying the Order Demand, Component Demand, Production Supply and Incoming Receipts charts for Inventory Business Unit=US010, Item ID=10002 and As of Date=Sep. 1, 2010, and the user now wants to see the same data for Item ID=10010, then he can use the Search link for each chart and change the Item ID to 10010 for each chart.

Although the data and graphs in this example are related to supply and demand, the techniques described herein are not limited to use with supply and demand data, and can be used with any other type of data, including data with different fields, schemas, and charts. The first chart 306 includes a label 326, "Demand Value by Status," that describes the chart 306, and a pie chart graphic 330 that shows the value of ordered items in three different categories (released, releasable, and unfulfilled). The data displayed in the chart 306 is retrieved from a storage medium, such as a database, using search criteria associated with the chart 306.

The search criteria can be specified by a user in a number of ways, which are referred to herein as predefined analytic searches, custom searches, and multi-chart searches. As an example of a predefined analytic search, the chart 306 includes an analytic selector 332 that a user can adjust to choose an analytic, e.g., a query, from a set of predefined queries, that is used to retrieve the data to be displayed in the chart 306. An example analytic named "INV-Order Demand" has been selected in the chart 306. This analytic selects inventory order data from the database, using search criteria (not shown) to determine which portion(s) of the data to use in the chart 306. The search criteria can be, e.g., a value that a particular field is to have if the field's record to be included in the search results. For example, the criteria Source="Sales Order" can be used to restrict the results shown in the chart 306 to include only data records that have the value "Sales Order" in their Source field, i.e., demand that is from a sales order.

In one embodiment, the chart presentation user interface 300 includes a search template feature 302, which enables a user to store search criteria as a "template" with a specified name or ID 324. A user can store the current search criteria, including any custom search criteria defined as described below with reference to FIG. 3C, as a template by providing a template name in a Save as Template field 324 and selecting a Save Current Template option 320. To retrieve the stored search criteria at a later time, a user can specify the name or identifier of a previously-stored template, e.g., "CASCADE", in a Template ID field 322. The stored search criteria can be automatically applied to the charts 306-312 upon being retrieved.

Figure 3B:
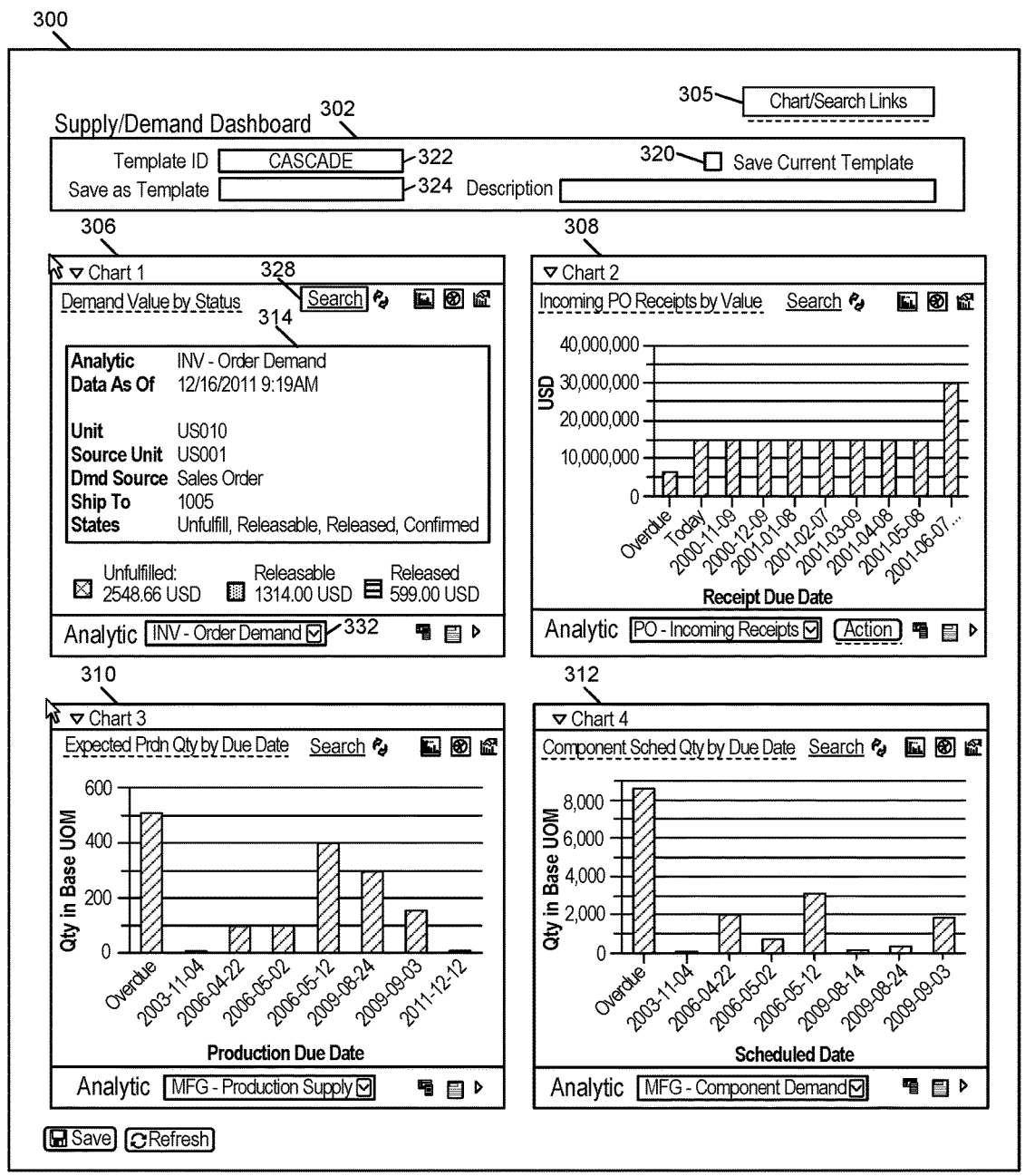
FIG. 3B shows a search summary box 314 that displays the search criteria in effect for a chart in accordance with one embodiment.

FIG. 3B shows a search summary box 314 that displays the search criteria in effect for the chart 306 in accordance with one embodiment. The search summary box 314 is displayed when, for example, the user positions, i.e., hovers, a cursor over the chart 306. The search summary 314 is thus a form of hover text in this example. As shown, the search summary 314 includes the Analytic Name (INV-Order Demand), as well as the search criteria: Business Unit (US010), Source Business Unit (US001), Source name (Sales Order), Ship To number (1005), and order states (unfulfilled, releasable, released, confirmed). The data records on which the chart graphic 330 is based have the values shown in the search summary 314 for the respective fields because they match the search criteria. In another embodiment, the search criteria can be an expression in a query language, and data records in the database are included in the data used to construct the chart if those records satisfy the expression.

Figure 3C:
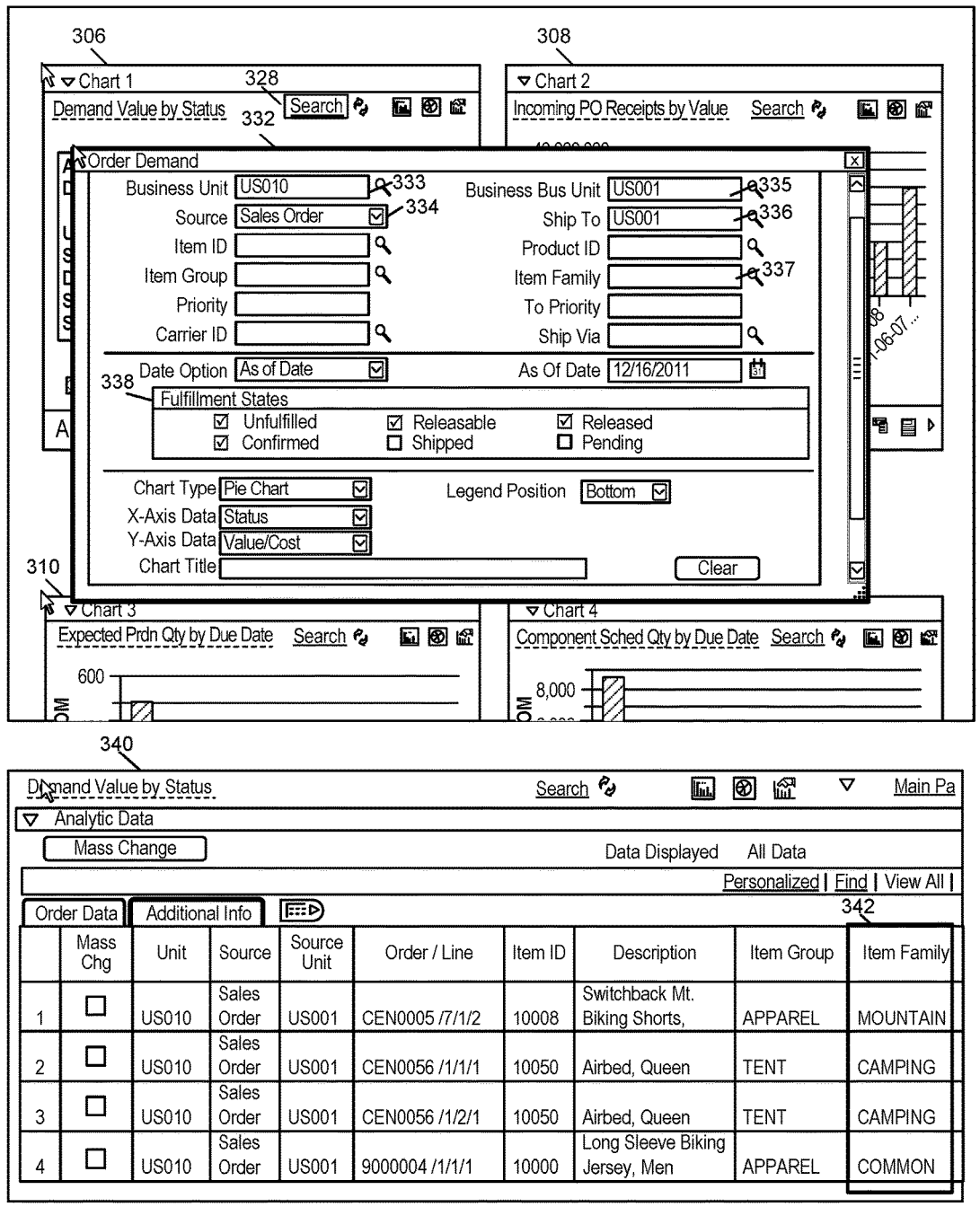
FIG. 3C shows a search criteria input box in accordance with one embodiment.

FIG. 3C shows a search criteria input box 332 in accordance with one embodiment. The search input box 332 displays the search criteria for an associated chart 306. The search input box 332 for the chart 306 is displayed when a user selects a Search link 328 in the chart 306. Thus, the search input box applies to one specific chart, and other charts 308-312 have different search input boxes. The search input box 332 includes input fields for which a user can select or enter data values, such as a Business Unit field 333, a Source field 334, a Source Business Unit field 335, a Ship To field 336, and an Item Family field 337 (empty in FIG. 3C), and a fulfillment state/status selector 338.

The search criteria, including the criteria displayed or entered in the search input box 333, is displayed in the search summary 314 when the user moves the mouse cursor over the chart 306, as described above. The Item Family field 337 is empty in FIG. 3C, indicating that there is no restriction on the Item Family for records used to construct the chart 306. The data records used to construct the chart 306 are shown in a data table 340. Since there is no restriction on the Item Family value in FIG. 3C, the data includes records with any Item Family value, as shown by the Item Family column 342, which has the values MOUNTAIN, CAMPING, and COMMON.

In one embodiment, the search criteria can be implemented as part of a database query (not shown) that is associated with the chart 306. The database query can be executed by the database to select and retrieve the data for the chart from the database. The search criteria can be translated to a query language, e.g., Structured Query Language ("SQL"), and included in the query. A query can be, for example, an SQL select statement as described above, or a query in another query language, or some other representation of a query. In the case of an SQL query, the search criteria can be represented as an SQL "where" clause. For example, the demand values for the chart 306 can be selected from the database using the SQL query "select value from inventory where Source="Sales Order". The records retrieved by this query can then be grouped by their fulfillment state (e.g., released, releasable, unfulfilled), and the total demand value of the records in each fulfillment state can be used to determine the size of the chart component, e.g., pie slice or bar, that corresponds to that state. The selected analytic 332 can also specify the type of chart, e.g., pie chart, bar chart, or the like, and other properties of the chart such as the data that corresponds to the values illustrated by a pie chart or the data that corresponds to the horizontal and vertical axes of a bar chart.

In one embodiment, custom searches can be defined by users to modify and/or further restrict analytic searches, or in other examples, as alternatives to analytic searches. Users can define custom searches by selecting a Search link 328, which causes a query input box 332 to be displayed as shown in FIG. 3C. As described above, the query input box 332 includes one or more data fields 333-338 for which the user can provide values. Each data field for which the user provides a value is translated to a search condition. For example, if the user changes the value of a field that is part of the analytic query, e.g., the Business Unit field 333, then the query associated with the chart 306 is changed to include the new value, e.g., "US010", in place of a previous value, e.g., "US009". If the user provides a value for a field that was previously undefined, e.g., not part of the selected analytic search, then a corresponding additional query condition is added to the query associated with the chart 306. For example, if the analytic does not specify a value for the Item Family field, then when the user selects the Search link 328, there is no value for the Item Family field. The user can enter a value for the Item Family field to create custom search criteria. For example, if the user enters the value "MOUNTAIN" in the Item Family field's text box, then the criteria Item Family="MOUNTAIN" is added to the search query, and when the query is executed, the chart 306 will be refreshed (i.e., redrawn) using data records that have an Item Family value of MOUNTAIN.

Although four charts are shown in the user interface 300, other configurations are possible. For example, the user can change the number and types of charts. Different charts may display the results of different corresponding queries. Different charts may also display different views or fields of the results of the same query.

Figure 4A:
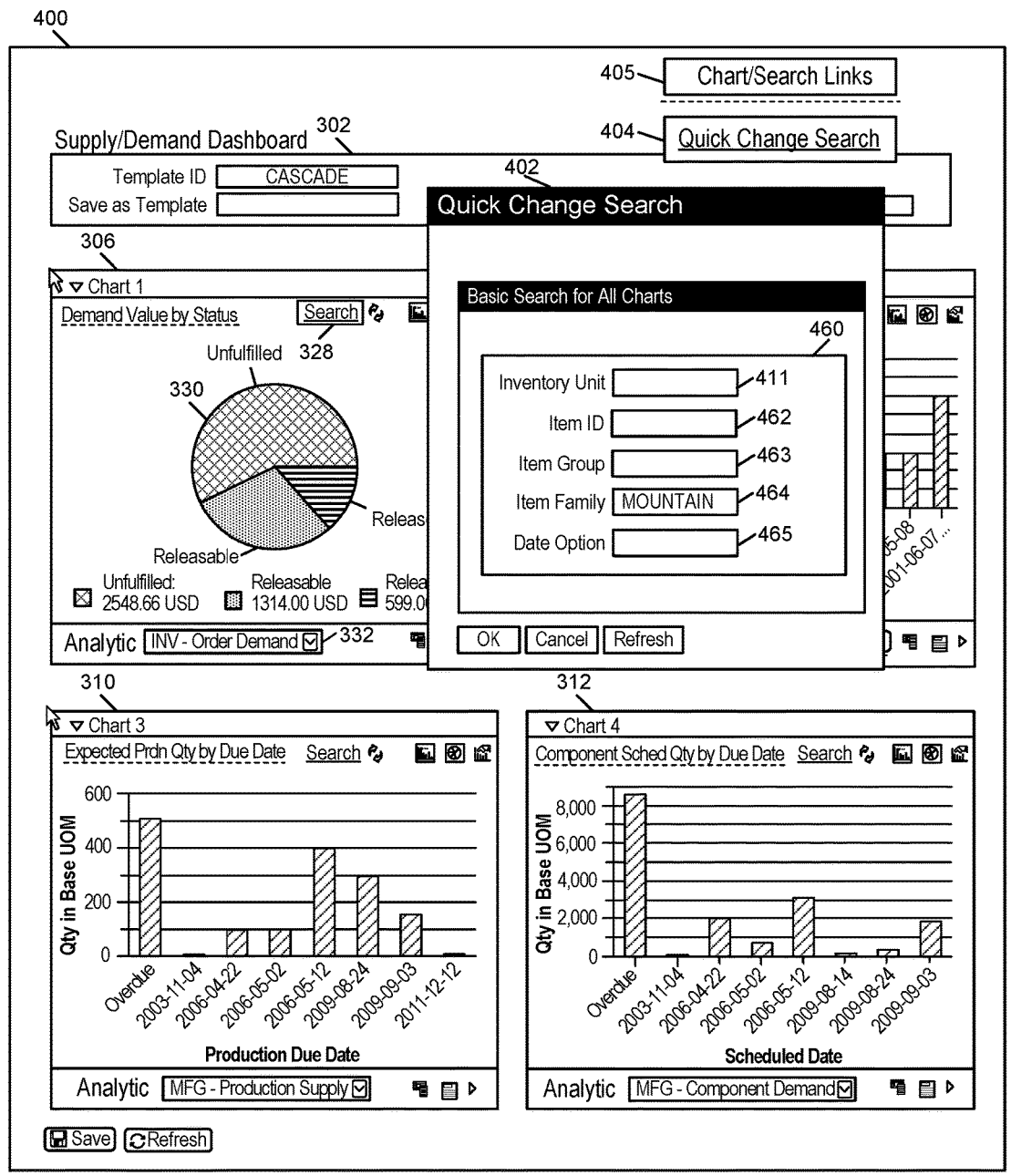
FIGS. 4A and 4B illustrate a multi-chart search user interface in accordance with one embodiment.
Figure 4B:
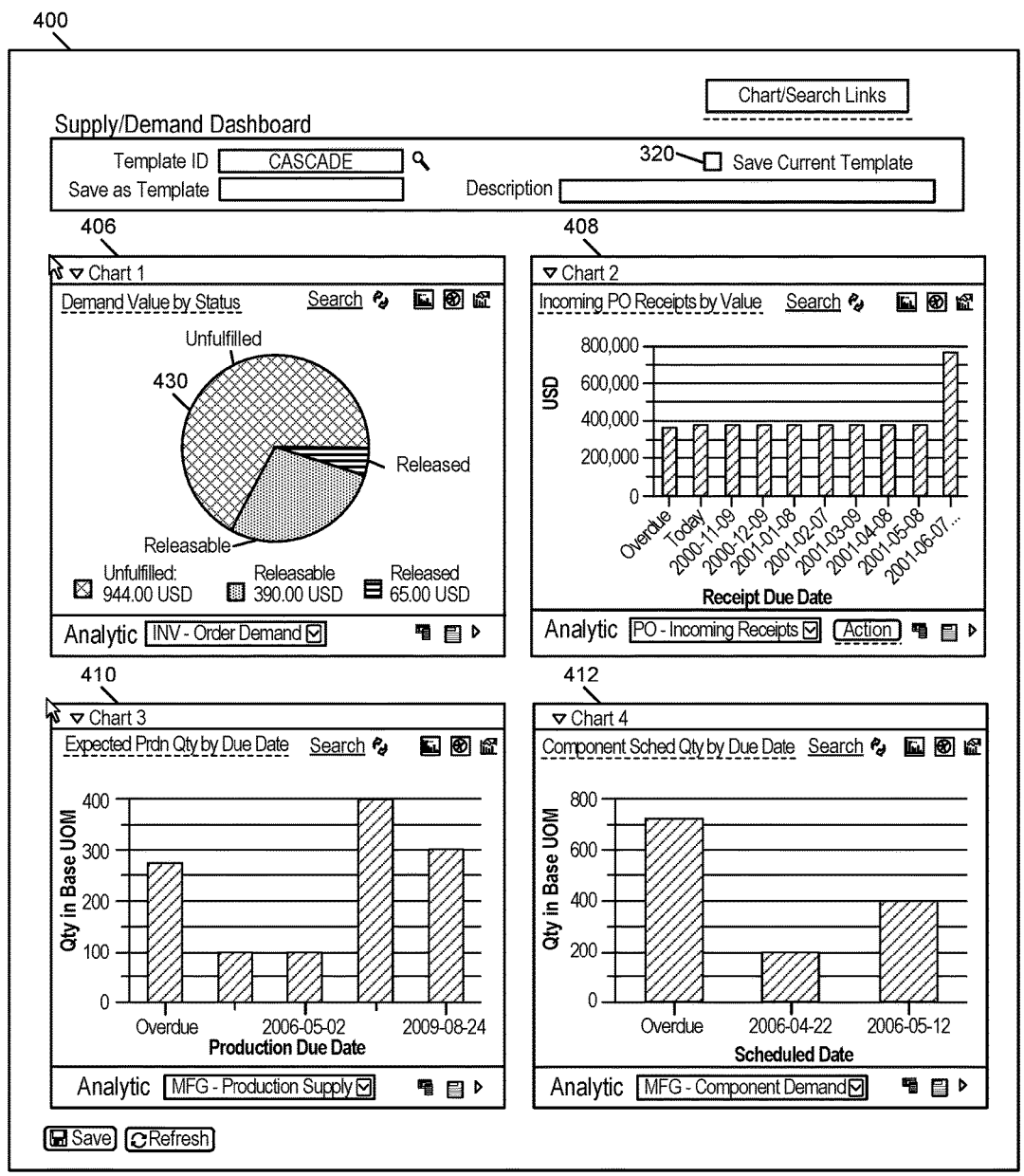

FIGS. 4A and 4B illustrate a multi-chart, i.e., "cascading", search user interface 400 in accordance with one embodiment. In multi-chart searches, a user can enter search criteria once and apply the search criteria to multiple charts 306-312 using a single request. In the single request, the user only selects the button or other command once to apply the search criteria to multiple charts 306-312. The analytic searches and custom searches described above with reference to FIGS. 3A-3C each apply to a single associated chart. However, since there are multiple charts in the chart user interfaces 300,400, defining custom searches can involve entering the same query information for each chart, which can be repetitive and time-consuming. The user interface 400 therefore provides a Quick Change Search input dialog box 402, in which a user can enter search criteria for data fields that are present in two or more of the charts 306-312. A user can cause the Quick Change Search dialog box 402 to appear by selecting a Chart/Search Links button 405, and then selecting a Quick Change Search link 404. As illustrated here, clicking on the Quick Change Search link 304 takes the user to a popup window 402 where the user can quickly change the values of the search fields 461-465 that apply to the charts 306-312 that appear on the Dashboard user interface 302. The user then submits the change in a single request by selecting the OK button.

In one example, the Quick Change Search dialog box 402 displays one or more fields 460 that are present in all of the charts 306-310 of the chart user interface 400. A user can enter search criteria in the Quick Change Search dialog box 402, and criteria is applied to all of the charts 306-310. The Quick Change Search dialog box 402 includes the fields Inventory Unit 461, Item ID 462, Item Group 463, Item Family 464, and Date Option 465. A user can enter values for one or more of these fields and select the OK button to cause search criteria based on the values entered to be applied to all four charts 306-312. For example, the user has entered the value MOUNTAIN in the Item Family field 464 of the Quick Change Search box 402. When the user selects the OK button to apply the search criteria, the Quick Change Search box 402 closes and the search criteria associated with the four charts 406-412 are updated to include the criteria Item Family=MOUNTAIN. A corresponding query condition, such as "where ItemFamily=MOUNTAIN", is added to each of the queries associated with each of the charts 406-412. The updated queries are then executed, the results of the queries are retrieved from the database, and the charts 406-412 are refreshed, e.g., redrawn, using the results of the updated queries. The redrawn charts 406-412 for this example are shown in FIG. 4B. As can be seen, the relative sizes of the slices in the pie chart graphic 430 have changed in comparison to the chart graphic 330.

In one aspect, as introduced above, the Cascading Search feature allows the user to change some of the search criteria such as Inventory Business Unit, Item ID, Item Group, Item Family and the Date Option (and associated date fields) once for all four of the charts 406-412 on the Dashboard 300. For example, to change the Item ID 462 to "10010" for all four charts 306-312, the user can click on the "Quick Change Search" link 304 at the top of the Dashboard 300, change the Item ID 462 to "10010" and select the OK button to change the search criteria for all four of the charts 406-412.

Behind the scenes, the data can be already loaded into a web page that represents the user interface 300, so when the user changes the search criteria via the "Quick Change Search" link 304, the applicable fields can be updated in a SQL statement that represents the search criteria, and then the data can be re-retrieved, i.e., refreshed or updated. This solution saves the user time, and allows the user to quickly see a consistent picture of the data across all of their demand and supply. In the prior solution, the user had to change the same criteria four times, and also ran the risk of entering incorrect search criteria for one or more of the charts. Embodiments of the present invention provide for performing searches on data throughout any software product, and this solution increases productivity and allows the user to quickly get a clear picture of their supply and demand situation.

Figure 4C:
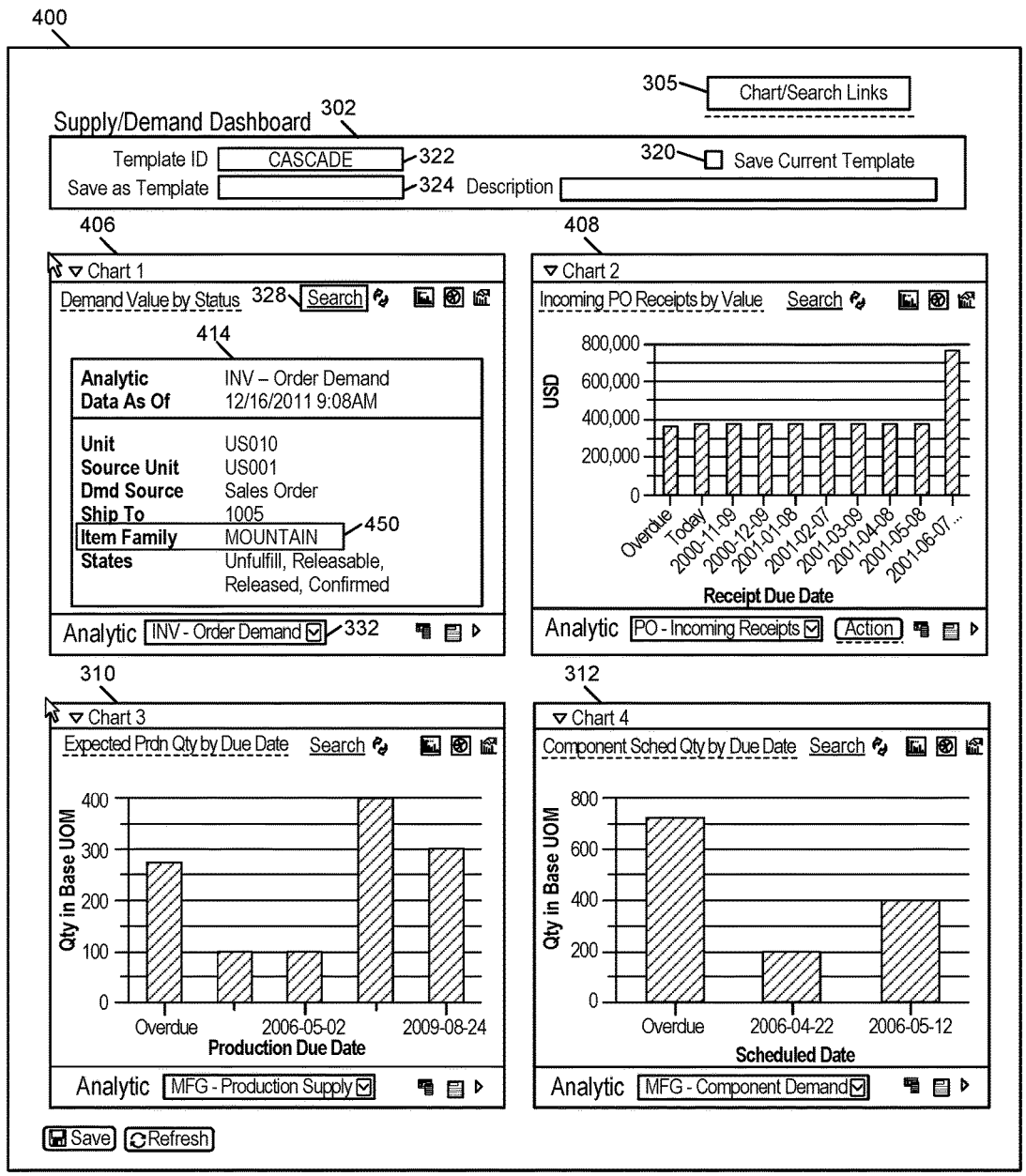
FIG. 4C illustrates a search summary box 414 that displays the search criteria in effect for the chart after the multi-chart search criteria has been applied in accordance with one embodiment.

FIG. 4C illustrates a search summary box 414 that displays the search criteria in effect for the chart 406 after the multi-chart search criteria has been applied in accordance with one embodiment. The search summary box 414 is displayed when, for example, the user positions, i.e., hovers, a cursor over the chart 406. As shown, the search summary 414 includes the Item Family field 450 with the value MOUNTAIN, as specified in the Quick Change Search box 402, in addition to the other fields that are set by the analytic query, as described with respect to the search summary box 314 of FIG. 3B. The data records on which the chart graphic 430 is based have the values shown in the search summary 414 for the respective fields.

Figure 4D:
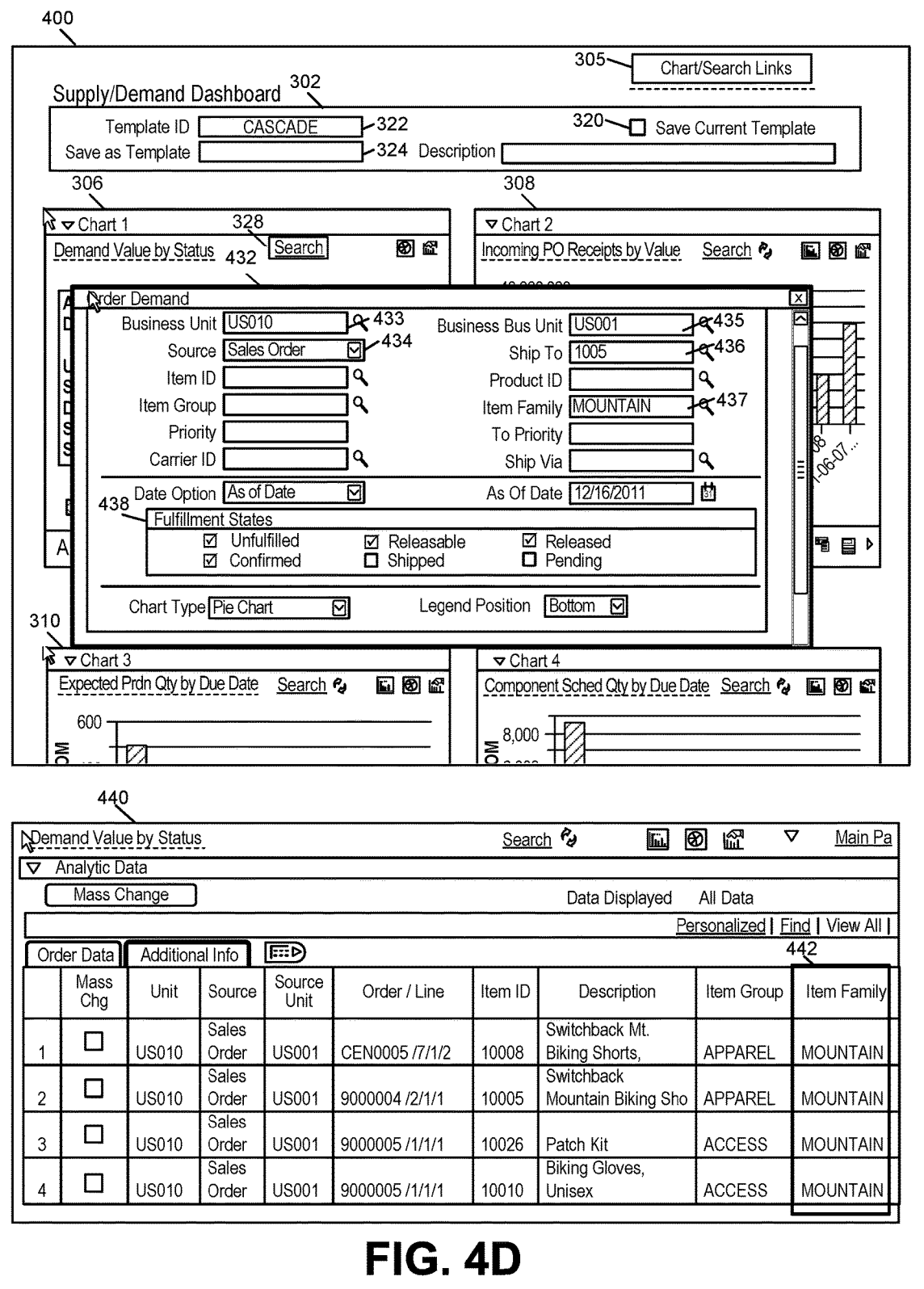

FIG. 4D illustrates a search criteria input box 432 in a chart user interface 400 in accordance with one embodiment. The search input box 432 is similar to the search input box 332 of FIG. 3C, but has a value "MOUNTAIN" in the Item Family input field 437. The value MOUNTAIN is automatically filled in because the Item Family field 414 was set to MOUNTAIN in the Quick Change Search box 402 of FIG. 4A. The value MOUNTAIN indicates that only records having an Item Family field with a value of MOUNTAIN are to be used to construct the chart 306. The data records used to construct the chart 306 are shown in a data table 440. Since the Item Family field is restricted to the value MOUNTAIN, the data includes only records that have the value MOUNTAIN in the Item Family column 442.

As illustrated here, any of the fields 433-437 of the search criteria input box 432 can be changed to a new value, or can be left blank, or changed to a blank value. If a field is blank, then the previous value of the search field can be maintained when the data is fetched and the chart is drawn. The search field values can be applied to each of the charts 306-312 (in this case, 4 charts) with a selected analytic, and the data can be reselected and fetched from the database, causing the data for the charts to be refreshed and the charts to be re-drawn using the refreshed data.

In one embodiment, as introduced above with reference to FIG. 3A, the chart presentation user interface 400 includes a search template feature 302, which enables a user to store search criteria as a "template" with a specified name or ID 324. Shared search criteria, such as that defined in the Quick Change Search box 402, can be stored with the template. The shared search criteria that applies to the queries 306-312 in the user interface 400 is stored as part of a template when the template is stored using the Save Current Template option 320. When the template is retrieved, e.g., by a user specifying the template name or identifier in the Template ID field 322, the shared search criteria is retrieved and automatically included in the queries associated with the charts 306-312. For example, if the shared search criteria is Item Family=MOUNTAIN, then upon retrieving the template, the Item Family field of the search criteria is set to MOUNTAIN for each of the charts 306-312.

In one embodiment, as described above with reference to FIG. 3C, each chart 306-312 can have its own search page (e.g., per-chart search criteria input box 332) with additional fields that are not present in the search input box 432, but it takes more time to work with each individual chart. That is, each analytic has its own search criteria input box. The Cascading Search feature can take the search fields that are common to, i.e., present on, each of the analytics (for example, Inventory Unit, Item ID, Item Group, Item Family and Date Option) and can combine the common search fields onto one shared search criteria dialog box or page (e.g., the Quick Change Search box 402) that can be used to update the data for some or all four of the charts at once. These features provide a shortcut that enables the user to quickly affect some or all of the charts with one set of changes, instead of working with each chart separately.

Figure 5:
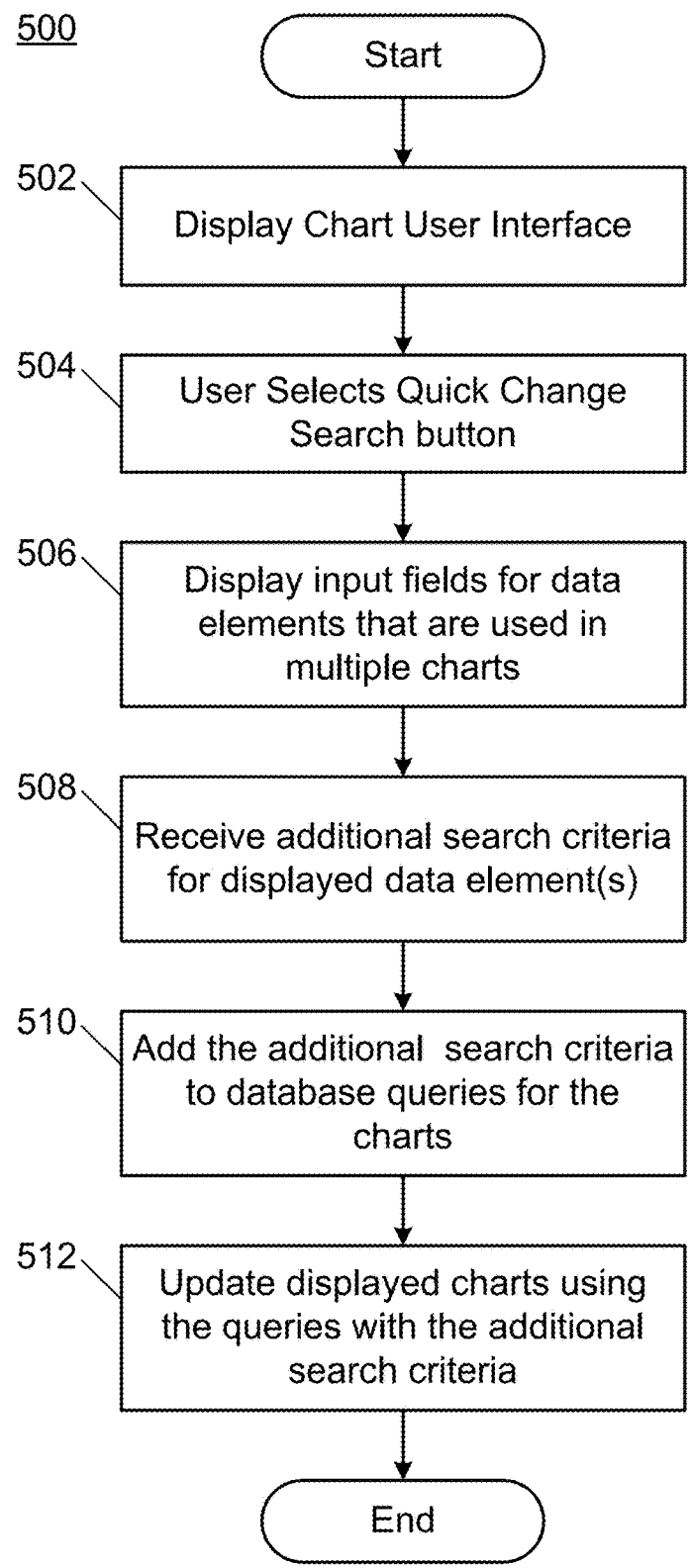
FIG. 5 is an illustrative flow diagram of a chart user interface update process in accordance with one embodiment.

FIG. 5 is an illustrative flow diagram of a chart user interface update process in accordance with one embodiment. Machine-readable code implementing the process illustrated in FIG. 5 may be stored on a machine-readable medium and executed by a computer processor. The process begins at block 502, which displays the chart user interface 400. In block 504, the user selects the Quick Change Search button 404 to cause the Quick Change Search dialog box 402 to be displayed and receive user input. Block 506 identifies data fields that are used in multiple charts (e.g., in all charts displayed in the user interface 400), and causes input fields for those data fields to be displayed in the Quick Change Search dialog box 402. Block 508 receives search criteria for one or more of the input fields displayed in the dialog box 402. Block 510 adds the received search criteria to each database query associated with each chart. Block 512 executes the updated database queries and updates the displayed charts using the information returned by the updated database queries.

Figure 6:
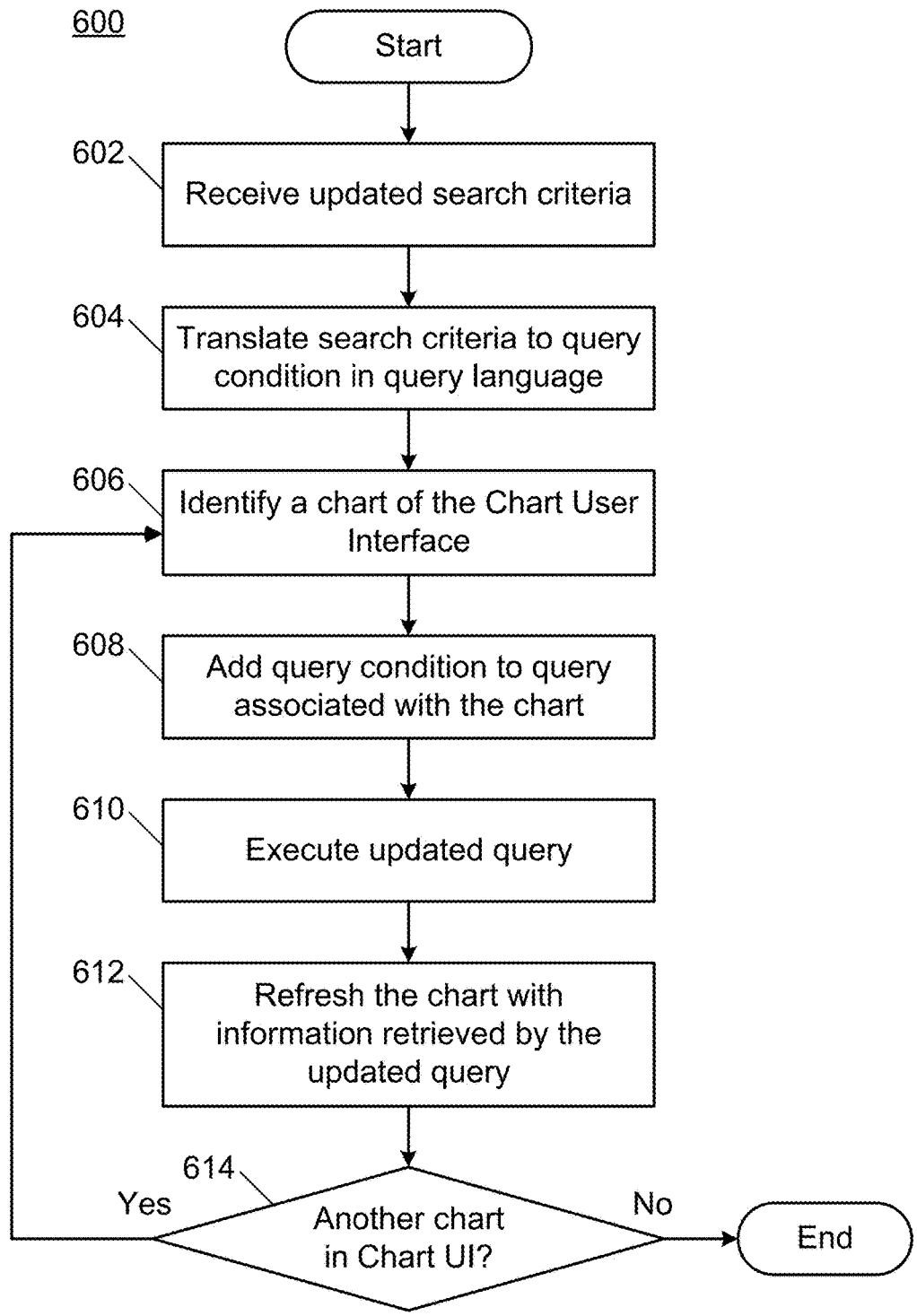
FIG. 6 is an illustrative flow diagram of a process of updating individual charts in accordance with one embodiment.

FIG. 6 is an illustrative flow diagram of a process of updating individual charts in accordance with one embodiment. Machine-readable instructions implementing process illustrated in FIG. 6 may be stored on a machine-readable medium and executed by a computer processor, for example. The process begins at block 602 by receiving updated search criteria, such as that received in block 508 of FIG. 5. Block 604 translates the updated search criteria to a query condition, which can be a conditional expression in a query language such as SQL. For example, the search criteria Item Family=MOUNTAIN is translated to the SQL where clause "where ItemFamily='MOUNTAIN.'" The expression in this example is "ItemFamily=MOUNTAIN." The where clause can be appended to an SQL select statement to form a statement such as "select fieldname from tablename where ItemFamily='MOUNTAIN' and BusinessUnit='US010'". The illustrative BusinessUnit portion of the where clause is from separately-specified search criteria, such as that associated with an analytic. Block 606 identifies a chart of the chart user interface, such as the chart 306 of FIG. 4A. Block 608 adds the query condition determined in block 604 to the query associated with the identified chart. Block 610 executes the updated query. Alternatively, the updated query can be executed later, e.g., the queries for all charts can be executed after all of the chart queries have been updated. Block 612 refreshes the identified chart with information retrieved by the updated query. Block 614 determines if there is another chart to be processed in the chart user interface. If so, the process repeats, starting from block 606, for the next chart to be processed. If there are no further charts to be processed, then all charts in the user interface have been updated, and the process ends.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A computer-implemented method, comprising:
   displaying a plurality of charts via a user interface, wherein each chart of the plurality of charts is associated with a distinct data query from a plurality of data queries, wherein displaying the plurality of charts comprises, for each particular chart in the plurality of charts:
   executing the distinct data query associated with the particular chart; and
   populating the particular chart with data returned from execution of the distinct data query;
   in response to a selection of a search criteria user interface component:
   (a) determining, for each particular chart of the plurality of charts, a set of data fields present in the distinct data query associated with the particular chart;
   (b) searching the combined sets of data fields to determine one or more common data fields that are present in two or more of the distinct data queries associated with the plurality of charts; and (c) providing, via the user interface, an input field for each of the one or more common data fields;

receiving one or more data values for the one or more common data fields via the one or more input fields in the user interface;

in response to receiving the one or more data values via the one or more input fields, modifying the distinct data query associated with each of the plurality of charts, the modifying including adding each of the one or more data values received for the one or more common data fields into each distinct data query, thereby generating a plurality of modified distinct data queries based on a single input to each common data field, and thereby assuring consistency between the common data fields within the plurality of modified distinct data queries;

executing the plurality of modified distinct data queries; and updating the display of each of the plurality of charts, said updating including, for each particular chart in the plurality of charts, populating the particular chart with data returned from execution of the modified distinct data query associated with the particular chart, thereby assuring consistency between common data fields represented within each of the plurality of updated charts.

2. The method of claim 1, wherein for each chart of the plurality of charts the distinct data query associated with the chart comprises one or more data values associated with at least one of the data fields in the set of data fields present in the distinct data query.

3. The method of claim 1, wherein modifying each distinct data query comprises including conditional expressions in the data query containing each of the one or more data values received for the one or more common data fields into the distinct data query.

4. The method of claim 3, wherein modifying each distinct data query further comprises adding a condition based upon at least one of the common data fields in the one or more common data fields to the conditional expressions in the distinct data query.

5. The method of claim 1, wherein displaying the plurality of charts in the user interface comprises displaying a graphical chart element for a first chart of the plurality of charts, the graphical chart element being proportional in size to a value of a data field of the results of executing the data query associated with the first chart.

6. The method of claim 1, wherein each data field in the set of data fields associated with each chart correspond to one or more database columns in a database.

7. The method of claim 6, wherein the plurality of data queries are configured to select data from the database using a conditional expression that references the one or more database columns.

8. The method of claim 1, further comprising:

displaying, via the user interface, a plurality of different search criteria user interface components, wherein the plurality of search criteria user interface components include:

(a) the selected search criteria user interface component, configured to provide the input field for each of the common data fields, and (b) a separate search criteria user interface component for each of the plurality of charts displayed via the user interface, wherein each separate search criteria user interface component associated with a particular chart is configured to provide input fields for each of the data fields present in the distinct data query associated with the particular chart.

9. The method of claim 1, wherein searching the combined sets of data fields to determine the common data fields that are present in two or more of the distinct data queries is performed via a cascading search feature.

10. A computer-readable memory device having stored thereon instructions, which when executed by a processor causes the processor to:

display a plurality of charts via a user interface, wherein each chart of the plurality of charts is associated with a distinct data query from a plurality of data queries, wherein displaying the plurality of charts comprises, for each particular chart in the plurality of charts:

execute the distinct data query associated with the particular chart; and populate the particular chart with data returned from execution of the distinct data query;

in response to a selection of a search criteria user interface component:

(a) determine, for each particular chart of the plurality of charts, a set of data fields present in the distinct data query associated with the particular chart;

(b) search the combined set of data fields to determine one or more common data fields that are present in two or more of the distinct data queries associated with the plurality of charts; and (c) provide, via the user interface, an input field for each of the one or more common data fields;

determine, for each particular chart of the plurality of charts, a set of data fields present in the distinct data query associated with the particular chart;

determining one or more common data fields using the determined plurality of sets of data fields, wherein each of the one or more common data fields is present in the distinct data query associated with each particular chart of the plurality of charts;

provide, via the user interface, an input field for each of the one or more common data fields;

receive one or more data values for each of the one or more common data fields via the one or more input fields in the user interface;

in response to receiving the one or more data values via the one or more input fields, modify the distinct data query associated with each of the plurality of charts, the modifying including adding each of the one or more data values received for the one or more common data fields into each distinct data query, thereby generating a plurality of modified distinct data queries based on a single input to each common data field, and thereby assuring consistency between the common data fields within the plurality of modified distinct data queries;

execute the plurality of modified distinct data queries; and update the display of each of the plurality of charts, said updating including, for each particular chart in the plurality of charts, populating the particular chart with data returned from execution of the modified distinct data query associated with the particular chart, thereby assuring consistency between common data fields represented within each of the plurality of updated charts.

11. The computer-readable memory device of claim 10, wherein for each chart of the plurality of charts, the distinct data query associated with the chart comprises one or more data values associated with at least one of the data fields in the set of data fields present in the distinct data query.

12. The computer-readable memory device of claim 10, wherein the instructions that cause the processor to modify each distinct data query further includes instructions that cause the processor to include conditional expressions in the data query containing each of the one or more data values received for the one or more common data fields into the distinct data query.

13. The computer-readable memory device of claim 12, wherein the instructions that cause the processor to modify each distinct data query further includes instructions that cause to processor to add a condition based upon at least one of the common data fields in the one or more common data fields to the conditional expressions in the distinct data query.

14. The computer-readable memory device of claim 10, wherein the instructions that cause the processor to display the plurality of charts in the user interface further includes instructions that cause the processor to display a graphical chart element for a first chart of the plurality of charts, the graphical chart element being proportional in size to a value of a data field of the results of executing the data query associated with the first chart.

15. The computer-readable memory device of claim 10, wherein each data field in the set of data fields associated with each chart correspond to one or more database columns in a database.

16. The computer-readable memory device of claim 15, wherein the plurality of data queries are configured to select data from the database using a conditional expression that references the one or more database columns.

17. A system, comprising:
a processor; and
a memory having stored thereon instructions that, when executed by the processor, causes the processor to:
  display a plurality of charts via a user interface, wherein each chart of the plurality of charts is associated with a distinct data query from a plurality of data queries, wherein displaying the plurality of charts comprises, for each particular chart in the plurality of charts:
    execute the distinct data query associated with the particular chart; and
    populate the particular chart with data returned from execution of the distinct data query;
  in response to a selection of a search criteria user interface component:
    (a) determine, for each particular chart of the plurality of charts, a set of data fields present in the distinct data query associated with the particular chart;
    (b) search the combined set of data fields to determine one or more common data fields that are present in two or more of the distinct data queries associated with the plurality of charts; and
    (c) provide, via the user interface, an input field for each of the one or more common data fields;
  receive one or more data values for each of the one or more common data fields via the one or more input fields in the user interface;
  in response to receiving the one or more data values via the one or more input fields, modify the distinct data query associated with each of the plurality of charts, the modifying including adding each of the one or more data values received for the one or more common data fields into each distinct data query, thereby generating a plurality of modified distinct data queries based on a single input to each common data field, and thereby assuring consistency between the common data fields within the plurality of modified distinct data queries;
  execute the plurality of modified distinct data queries; and
  update the display of each of the plurality of charts, said updating including, for each particular chart in the plurality of charts, populating the particular chart with data returned from execution of the modified distinct data query associated with the particular chart, thereby assuring consistency between common data fields represented within each of the plurality of updated charts.

18. The system of claim 17, wherein for each chart of the plurality of charts, the distinct data query associated with the chart comprises one or more data values associated with at least one of the data fields in the set of data fields present in the distinct data query.

19. The system of claim 17, wherein the instructions that cause the processor to modify each distinct data query further includes instructions that cause the processor to include conditional expressions in the data query containing each of the one or more data values received for the one or more common data fields into the distinct data query.

20. The system of claim 19, wherein the instructions that cause the processor to modify each distinct data query further includes instructions that cause to processor to add a condition based upon at least one of the common data fields in the one or more common data fields to the conditional expressions in the distinct data query.

* * * * *

UNITED STATES PATENT AND TRADEMARK OFFICE
CERTIFICATE OF CORRECTION

PATENT NO. : 10,146,846 B2  
APPLICATION NO. : 13/436708  
DATED : December 4, 2018  
INVENTOR(S) : Genochio et al.

Page 1 of 1

It is certified that error appears in the above-identified patent and that said Letters Patent is hereby corrected as shown below:

In the Specification

In Column 7, Line 16, delete "example." and insert -- example, --, therefor.

Signed and Sealed this  
Third Day of December, 2019

Andrei Iancu  
*Director of the United States Patent and Trademark Office*